United States Patent

[11] 3,593,954

| | | |
|---|---|---|
| [72] | Inventors | Francis W. Ritchie;<br>Connie W. Garber, both of Peru, Ind. |
| [21] | Appl. No. | 43,409 |
| [22] | Filed | June 4, 1970 |
| [45] | Patented | July 20, 1971 |
| [73] | Assignee | Kofabco, Inc.<br>Peru, Ind. |

[54] SWIVEL CONNECTION FOR A CHAIR
9 Claims, 3 Drawing Figs.

[52] U.S. Cl.................................................. 248/425,
248/415, 297/349, 308/165
[51] Int. Cl........................................................F16m 13/00
[50] Field of Search....................................... 248/425,
415, 417, 418, 186, 183, 188.1; 308/163, 166,
165; 297/13, 349, 328; 108/139, 142

[56] References Cited
UNITED STATES PATENTS

| | | | |
|---|---|---|---|
| 1,999,949 | 4/1935 | Yawman | 308/165 X |
| 2,914,793 | 12/1959 | McMahan | 248/425 X |
| 2,921,623 | 1/1960 | Humphries et al. | 248/418 X |
| 3,253,858 | 5/1966 | Degen | 297/328 |

Primary Examiner—J. Franklin Foss
Attorney—Hood, Gust, Irish and Landy

ABSTRACT: A base for a swivel chair comprising an upstanding hollow support column providing, at its upper extent, a peripherally and outwardly extending lip, a retainer ring mounted on the column for movement upwardly toward the lip, a pair of lubricous bearing rings, one ring being disposed concentrically about the column to engage the underneath surface of the lip and the other ring resting concentrically on the upper surface of the lip, a seat mounting plate providing a generally centrally disposed locator portion extending downwardly through the upper bearing ring and into the upper portion of the column, and fastening means for connecting the retainer ring and the mounting plate together to hold the bearing rings respectively against the lower and upper surfaces of the lip.

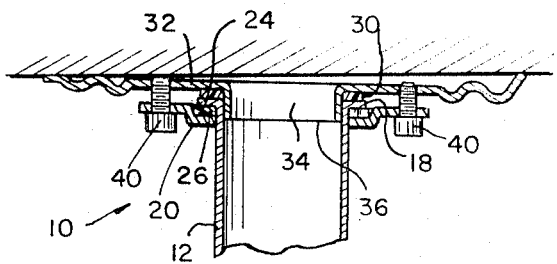
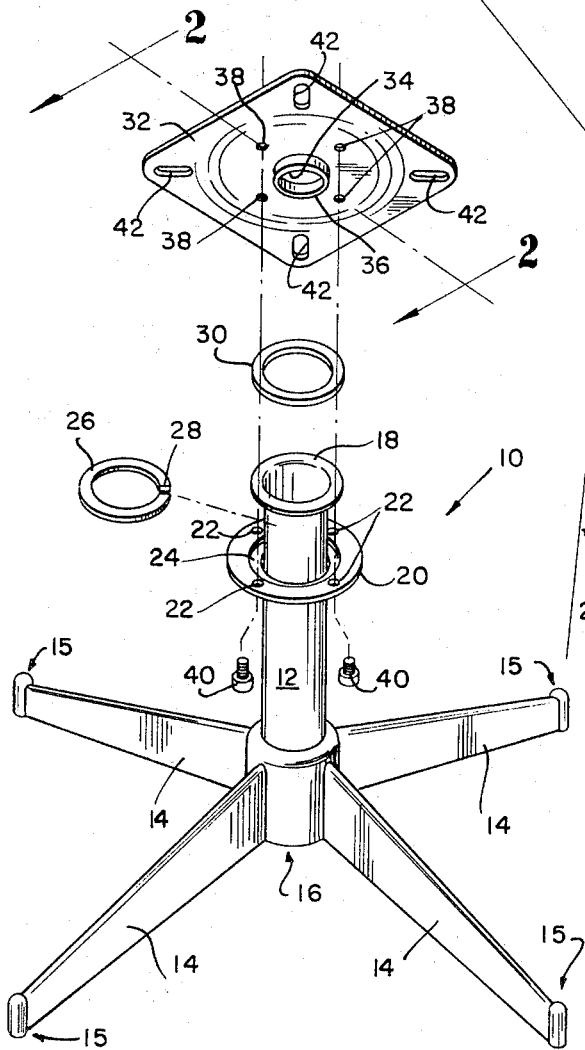
INVENTORS
FRANCIS W. RITCHIE
CONNIE W. GARBER

SWIVEL CONNECTION FOR A CHAIR

It is a primary object of our invention to provide an improved swivel connection for a swivel chair, the connection being extremely simple, yet effective for the purpose intended.

Swivel chairs conventionally are provided with upstanding, hollow support columns with seats swivelly connected by means of posts which extend telescopically downwardly into the columns. These posts are conventionally provided by welding or otherwise securely fastening a steel sleeve to the mounting plate on which the seat rests. Our invention eliminates the need for such posts. Specifically, our seat mounting plate is formed to provide a generally centrally arranged locator portion which extends downwardly into the upper portion only of the support column.

It is our concept to provide a hollow support column having, at its upper extent, a peripherally and outwardly extending lip, a retainer ring mounted on the column for movement upwardly toward the lip, a lubricous bearing ring disposed concentrically about the column to engage the underneath surface of the lip, and a second lubricous bearing ring resting concentrically on the upper surface of the lip. Our seat mounting plate is placed upon the upper bearing ring with its generally centrally arranged locator portion extending downwardly through the upper bearing ring and into the upper portion only of the column. We then provide fastening means for connecting the retainer ring and the mounting plate together to hold the said bearing rings respectively against the lower and upper surfaces of the lip on the column. The frictional forces resisting movement of the mounting plate relative to the column can be adjusted by tightening the said fastening means which load the bearing rings against the surfaces of the lip.

Other features and objects of our present invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is an exploded perspective view showing our base for a swivel chair;

FIG. 2 is an enlarged fragmentary sectional view taken from FIG. 1 generally along the lines 2—2; and FIG. 3 is a fragmentary sectional view showing a slightly different form of bearing than that used in FIG. 1.

Referring now to the drawings, and particularly to FIG. 1, it will be seen that we have shown our base 10 comprising an upstanding hollow support column 12 which, in the illustrative embodiment, is mounted on four radially outwardly and slightly downwardly extending legs 14. The distal end of each leg 14 is provided with a decorative, upwardly extending, closed-top sleeve which may be used, if desired, to hold the stem of a conventional caster. The legs 14 are connected to the column 12 as indicated at 16, but the manner in which the legs are connected to the column is not important to our present invention.

The upper end of the column 12 is formed to provide a peripherally and radially outwardly extending lip 18 as clearly seen, in cross section, in FIGS. 2 and 3. Either before the lip 18 if formed or before the connection is made at 16, a retainer ring 20 is mounted on the column 12 for movement upwardly toward the lip 18. In the illustrative embodiment, this retainer ring 20 is provided with four peripherally equally spaced perforations 22 and, at its radially inner portion, a peripherally extending recess 24. We place a lubricous plastic bearing 26, split as indicated at 28, in the recess 24 so that the upper surface of the bearing ring will uniformly engage the underneath surface of the lip 18. The bearing ring 26 is split as indicated at 28 to facilitate its placement on the column 12. The depth of the recess 24 is either equal to or slightly less than the thickness of the bearing ring 26.

We place a second lubricous plastic bearing ring 30 concentrically upon the upper surface of the lip 18. The position of this ring is shown clearly in FIG. 2.

Our base 10 includes a seat mounting plate 32 formed to provide a generally centrally arranged, downwardly extending locator portion 34, the outer diameter of which is just slightly less than the inner diameter of the column 12. This locator portion 34 extends downwardly through the second ring 30 into the upper portion only of the column 12, the portion 34 terminating as indicated at 36 at a point which is approximately adjacent to the position of the retainer ring 20 when it is clamping the lower bearing ring 26 against the lip 18. It will be appreciated that the sleevelike locator portion 34 may be formed by a conventional piercing and forming operation usually accomplished in sheet metal shops.

The seat mounting plate 32 is also provided with four equally peripherally spaced perforations 38 disposed to be in vertical registry, respectively, with the perforations 22 when the locator portion 34 is extending into the upper portion of the column 12. These perforations 38 are threaded and fastening elements, such as indicated at 40, extend through the perforations 22 to be threaded into the perforations 38. These threaded fastening elements 40 are effective to connect the mounting plate 32 securely to the retaining ring 20. The frictional forces with which the bearing rings 26, 30 engage the lower and upper surfaces, respectively, of the lip 18 can be selectively adjusted by loosening and tightening the fastening elements 40. Thus, the ease with which a seat fastened to the plate 32 can be swiveled relative to the legs 14 can be selectively adjusted.

It will be seen that we have illustrated the plate 32 provided with radially elongated slots 42 in each of its corners. These slots are used in fastening a seat to the mounting plate.

Referring now to FIG. 3, it will be seen that we may use a slightly different form of bearing ring 26', 30' engaging lip 18, like reference numerals representing like parts. In FIG. 3, the bearing ring 26' is shown provided with a peripherally and upwardly extending first shoulder portion 46 disposed radially outwardly from the outer peripheral extent of the lip 18 and the second bearing ring 30' is provided with a peripherally and downwardly extending second shoulder portion 48 disposed in vertical registry with the first shoulder portion. The shoulder portions 46, 48 are arranged so that, when the bearing rings 26', 30' are respectively against the lower and upper surfaces of the lip 18, the shoulder portions are in bearing contact. Thus, there is a direct bearing contact between the two bearing rings 26', 30' as well as between the bearing rings and the upper and lower surfaces of the lip 18.

Our swivel connection is extremely rugged in that any load tending to cock the mounting plate 32 relative to the axis of the column 12 is resisted by the engagement of the bearing rings 26, 30 with the lip 18 which may be quite rigid and unyielding. Any such cocking force would tend to push downwardly on one peripheral portion of the lip 18 and to pull upwardly on a diametrically opposite portion of the lip. Such a downwardly directed force would act against the upper ring 30 and such an upwardly directed force would act against the lower ring 26. We do not rely on the locator portion 34 to resist such cocking forces. In face, we rely on the portion 34 to locate the upper ring 30 relative to the lip 18.

The manner in which we uniformly load the bearing rings 26, 30 against the lip 18 provides an ideal means for selectively adjusting the ease with which the plate 32 swivels as well as means for adjusting for bearing wear.

What we claim is:

1. A base for a swivel chair comprising an upstanding hollow support column providing, at its upper extent, a peripherally and outwardly extending lip, a retainer ring mounted on said column for movement upwardly toward said lip, a lubricous bearing ring disposed concentrically about said column to engage the underneath surface of said lip, a second lubricous bearing ring resting concentrically on the upper surface of said lip, a seat mounting plate providing a generally centrally arranged locator portion extending downwardly through said second bearing ring and into the upper portion of said column, and fastening means for connecting said retainer ring and said mounting plate together to hold said bearing rings respectively against the lower and upper surfaces of said lip.

2. The invention of claim 1 in which said fastening means includes a plurality of threaded fastening elements effective selectively to establish the frictional forces resisting movement of said mounting plate about the axis of said column.

3. The invention of claim 1 in which the inner peripheral portion of said retainer ring is formed to provide a peripherally extending recess for receiving said first mentioned bearing ring, the depth of said recess being less than the thickness of said first mentioned bearing ring.

4. The invention of claim 3 in which said fastening means includes a plurality of threaded fastening elements effective selectively to establish the frictional forces resisting movement of said mounting plate about the axis of said column.

5. The invention of claim 1 in which said locator portion terminates at a point approximately adjacent to the vertical position of said retainer ring.

6. The invention of claim 4 in which said locator portion terminates at a point approximately adjacent to the vertical position of said retainer ring.

7. The invention of claim 6 in which the outer diameter of said sleeve portion is slightly less than the internal diameter of said column.

8. The invention of claim 1 in which said first mentioned bearing ring is provided with a peripherally and upwardly extending first shoulder portion disposed radially outwardly from the outer peripheral extent of said lip and said second bearing ring is provided with a peripherally and downwardly extending second shoulder portion disposed in vertical registry with said first shoulder portion, said shoulder portions being in bearing contact when said bearing rings are respectively against said lower and upper surfaces of said lip.

9. The invention of claim 8 in which said fastening means includes a plurality of threaded fastening elements effective selectively to establish the frictional forces resisting movement of said mounting plate about the axis of said column.